(12) United States Patent
Clermont et al.

(10) Patent No.: US 12,123,681 B2
(45) Date of Patent: Oct. 22, 2024

(54) ALIGNMENT MECHANISM

(71) Applicant: Sheltered Wings, Inc., Barneveld, WI (US)

(72) Inventors: Todd Clermont, Barneveld, WI (US); Ben Farrell, Barneveld, WI (US)

(73) Assignee: SHELTERED WINGS, INC., Barneveld, WI (US)

( * ) Notice: Subject to any disclaimer, the term of this patent is extended or adjusted under 35 U.S.C. 154(b) by 140 days.

(21) Appl. No.: 17/126,589

(22) Filed: Dec. 18, 2020

(65) Prior Publication Data

US 2021/0190458 A1 Jun. 24, 2021

Related U.S. Application Data

(60) Provisional application No. 62/949,778, filed on Dec. 18, 2019.

(51) Int. Cl.
| | |
|---|---|
| *F41G 1/473* | (2006.01) |
| *F41G 1/033* | (2006.01) |
| *F41G 11/00* | (2006.01) |
| *G01C 3/02* | (2006.01) |

(52) U.S. Cl.
CPC .............. *F41G 1/473* (2013.01); *F41G 11/00* (2013.01); *G01C 3/02* (2013.01); *F41G 1/033* (2013.01)

(58) Field of Classification Search
CPC .......... F41G 11/00; F41G 1/473; F41G 1/033; G01C 3/02
See application file for complete search history.

(56) References Cited

U.S. PATENT DOCUMENTS

| | | | | |
|---|---|---|---|---|
| 3,841,172 | A | | 10/1974 | Pilch |
| 4,026,054 | A | | 5/1977 | Snyder |
| 4,200,989 | A | * | 5/1980 | Brouthers ................. F41G 1/26 42/137 |
| 4,606,131 | A | * | 8/1986 | Domian .................... F41G 1/16 42/137 |
| 4,691,442 | A | * | 9/1987 | Center ...................... F41G 1/17 42/137 |
| 4,742,636 | A | * | 5/1988 | Swan .................... F41G 11/006 42/126 |

(Continued)

OTHER PUBLICATIONS

International Search Report and Written Opinion for International Application No. PCT/US20/65944 dated Apr. 1, 2021, 17 pages.

(Continued)

*Primary Examiner* — Michelle Clement
(74) *Attorney, Agent, or Firm* — Husch Blackwell LLP (57) ABSTRACT

An alignment mechanism uses two adjustment plates. A first adjustment plate is pivotal about a first adjustment axis and a second adjustment plate is rotatable about a second adjustment axis. The first and second adjustment axes are perpendicular to one another. The first plate has a front portion through which the first adjustment axis passes and a rear portion having a first alignment surface and a tension spring secured to the rear portion opposite the first alignment surface. The second adjustment plate has a front portion and a rear portion having a second alignment surface and a tension spring secured between the second alignment surface and the rear portion of the first adjustment plate.

12 Claims, 4 Drawing Sheets

(56) References Cited

U.S. PATENT DOCUMENTS

| | | | |
|---|---|---|---|
| 4,799,325 A * | 1/1989 | Booze | F41G 11/003 42/137 |
| 4,920,654 A * | 5/1990 | Sanders | F41G 1/16 42/142 |
| 5,033,219 A * | 7/1991 | Johnson | F41G 1/35 42/126 |
| 5,086,566 A * | 2/1992 | Klumpp | F41G 11/003 42/126 |
| 5,171,933 A | 12/1992 | Eldering | |
| 5,388,335 A * | 2/1995 | Jung | F41G 1/26 42/138 |
| 5,669,174 A | 9/1997 | Teetzel | |
| 5,813,159 A * | 9/1998 | Kay | G02B 23/00 42/114 |
| 7,121,037 B2 * | 10/2006 | Penney | F41G 11/001 42/126 |
| 7,181,882 B2 * | 2/2007 | Woodbury | F41G 1/42 42/137 |
| 7,526,890 B1 * | 5/2009 | Keng | F41G 1/26 42/144 |
| 7,610,712 B2 * | 11/2009 | Ertl | F41G 1/26 42/137 |
| 8,046,950 B2 | 11/2011 | Holmberg | |
| 8,413,365 B2 * | 4/2013 | Jung | F41G 11/003 42/137 |
| 8,448,374 B2 * | 5/2013 | Samson | F41G 11/003 42/138 |
| 9,506,723 B2 | 11/2016 | Teetzel et al. | |
| 10,254,532 B2 * | 4/2019 | Collin | G02B 23/10 |
| 10,605,565 B1 * | 3/2020 | Geissele | F41G 1/17 |
| 10,704,862 B2 * | 7/2020 | Chung | F41G 3/065 |
| 10,942,005 B2 * | 3/2021 | Teetzel | F41G 1/35 |
| 11,512,929 B2 * | 11/2022 | Olmsted | G02B 23/14 |
| 11,519,694 B1 * | 12/2022 | Hamm | F41G 1/467 |
| 2008/0092424 A1 * | 4/2008 | Keng | F41G 1/18 42/137 |
| 2015/0198415 A1 * | 7/2015 | Campean | F41G 1/30 42/137 |
| 2015/0198421 A1 * | 7/2015 | Crispin | F41G 11/006 42/126 |
| 2016/0377378 A1 | 12/2016 | Collin | |
| 2018/0087875 A1 | 3/2018 | Yost | |
| 2022/0178653 A1 * | 6/2022 | Connolly | F41G 1/387 |
| 2023/0054268 A1 * | 2/2023 | Schulte | F41G 1/30 |

OTHER PUBLICATIONS

Extended European Search Report for Application No. 20903986.6 dated Nov. 21, 2023 (9 pages).

* cited by examiner

ALIGNMENT MECHANISM

CROSS-REFERENCE TO RELATED APPLICATIONS

This application claims priority to and is a non-provisional application of U.S. Provisional Application No. 62/949,778 filed Dec. 18, 2020, which is incorporated herein by reference in its entirety.

FIELD

The disclosure relates to an alignment mechanism. In one embodiment, the disclosure relates to an adjustment mechanism for a rangefinder.

BACKGROUND

Rangefinders assist shooters in determining the distance to a target. Rangefinders can be stand-alone or mounted to a firearm, such as a rifle. Mounted rangefinders are first secured to a weapon and then adjusted such that the rangefinder aiming point is in co-alignment with the weapon's aiming point. After firing, however, the recoil of the weapon tends to move the aiming point of existing mounted rangefinders. The mounted rangefinder must then be readjusted after each time the weapon is fired. Similarly, transportation of the weapons when the rangefinder is mounted causes misalignment of the rangefinder. If the mounted rangefinder is not readjusted prior to firing, the rangefinder can give inaccurate readings. Readjusting a mounted rangefinder also takes time away from shooting.

For the reasons discussed above, having a mounted rangefinder with an aiming point that does not move upon firing or transport of a firearm is a big advantage. Thus, there is a large need for an alignment mechanism for a mounted rangefinder that can address these concerns.

SUMMARY

In one embodiment, the disclosure provides an alignment mechanism. In accordance with embodiments of the present disclosure, an alignment mechanism comprises a first adjustment plate pivotal about a first adjustment axis, the first adjustment plate comprising a front portion through which the first adjustment axis passes and a rear portion having a first alignment surface and a tension spring secured to the rear portion opposite the first alignment surface; a second adjustment plate rotatable about a second adjustment axis, the second adjustment plate comprising a front portion and a rear portion having a second alignment surface and a tension spring secured between the second alignment surface and the rear portion of the first adjustment plate, wherein the first adjustment axis is perpendicular to the second adjustment axis.

In an embodiment, the first adjustment plate is a horizontal adjustment plate and the second adjustment plate is a vertical adjustment plate. In another embodiment, the second adjustment plate includes a pair of legs extending outwardly away from the front portion. In still another embodiment, the second adjustment plate is configured to secure a rangefinder chassis. In a further embodiment, the second adjustment plate connects with the first adjustment plate at the second adjustment axis. In an embodiment, the second adjustment plate rotates relative to the first adjustment plate.

In another embodiment, the disclosure provides a rangefinder. In accordance with embodiments of the present disclosure, a rangefinder comprises a housing; a rangefinder chassis contained within the housing; and an alignment mechanism contained within the housing, wherein the alignment mechanism comprises a horizontal adjustment plate pivotal about a horizontal adjustment axis, the horizontal adjustment plate having a front portion through which the first adjustment axis passes and a rear portion having a horizontal alignment surface and a horizontal tension spring secured between the rear portion opposite the horizontal alignment surface and the housing, and a vertical adjustment plate rotatable about a vertical adjustment axis, the vertical adjustment plate having a front portion and a rear portion having a vertical alignment surface, wherein a vertical tension spring is secured between the vertical alignment surface and the rear portion of the horizontal adjustment plate, wherein the horizontal adjustment axis is perpendicular to the vertical adjustment axis, and wherein the rangefinder chassis is secured to the vertical adjustment plate.

In an embodiment, the vertical adjustment plate is rotational about the vertical adjustment axis relative to the horizontal adjustment plate. In a further embodiment, the vertical adjustment plate is secured to the horizontal adjustment plate at the vertical adjustment axis.

In an embodiment, the rangefinder further comprises a horizontal adjustment plunger which passes through a first opening in the housing to contact the horizontal alignment surface. In another embodiment, axial movement of the horizontal adjustment plunger into the housing causes compression of the horizontal tension spring from a first compressed state to a second compressed state. In a further embodiment, axial movement of the horizontal adjustment plunger into the housing causes the horizontal adjustment plate to pivot about the horizontal adjustment axis from a first position to a second position.

In an embodiment, the rangefinder further comprises a vertical adjustment plunger which passes through a second opening in the housing to contact the vertical alignment surface. In another embodiment, axial movement of the vertical adjustment plunger into the housing causes compression of the vertical tension spring from a first compressed state to a second compressed state. In a further embodiment, axial movement of the vertical adjustment plunger into the housing causes the vertical adjustment plate to rotate about the vertical adjustment axis relative to the horizontal adjustment plate from a first position to a second position.

In an embodiment, the horizontal tension spring and vertical tension spring are in compressed states over a range of motion of the horizontal adjustment plate and vertical adjustment plate, respectively.

In an embodiment, the rangefinder is configured to secure to a firearm. In an embodiment, the firearm is a rifle.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on," "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

As used herein, the term "firearm" refers to any device that propels an object or projectile in a controllable manner. Firearms include, but are not limited to, handguns, pistols, rifles, machine guns, and gaffing guns, inclusive of single shot firearms, semi-automatic firearms, and fully automatic firearms.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

In one embodiment, the disclosure relates to an alignment mechanism that allows the user to co-align the laser with the firearm. In another embodiment, the disclosure relates to an alignment mechanism that incorporates horizontal adjustments that allow the user to co-align the laser with the firearm.

In one embodiment, the disclosure relates to an alignment mechanism that allows the user to co-align the laser with the firearm and the viewing optic. In another embodiment, the disclosure relates to an alignment mechanism that incorporates horizontal adjustments that allow the user to co-align the laser with the firearm and the viewing optic.

Figure 1:
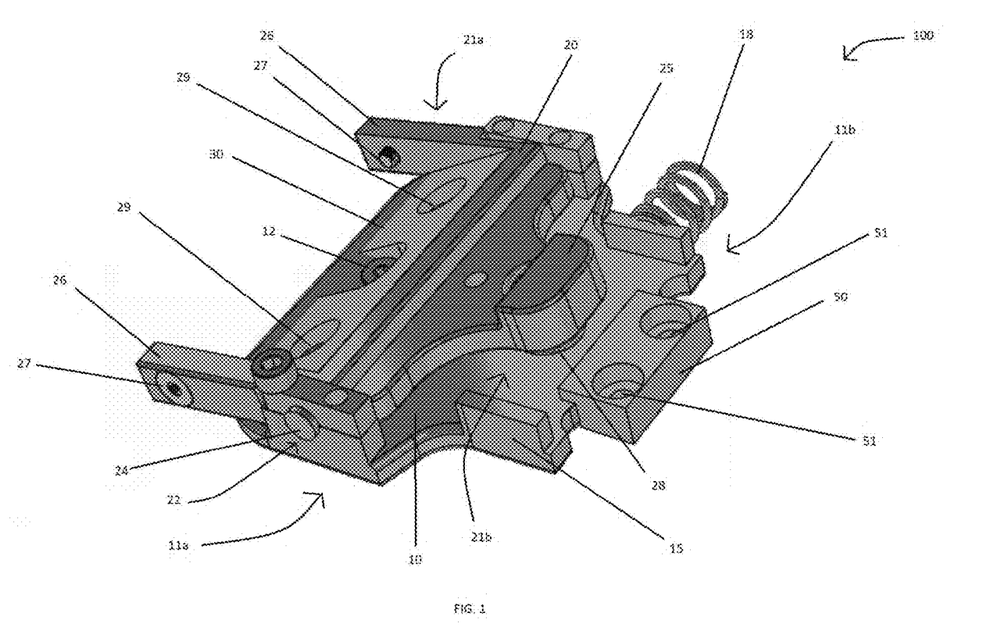
FIG. 1 is a left top perspective view of an alignment mechanism in accordance with embodiments of the present disclosure.
Figure 2:
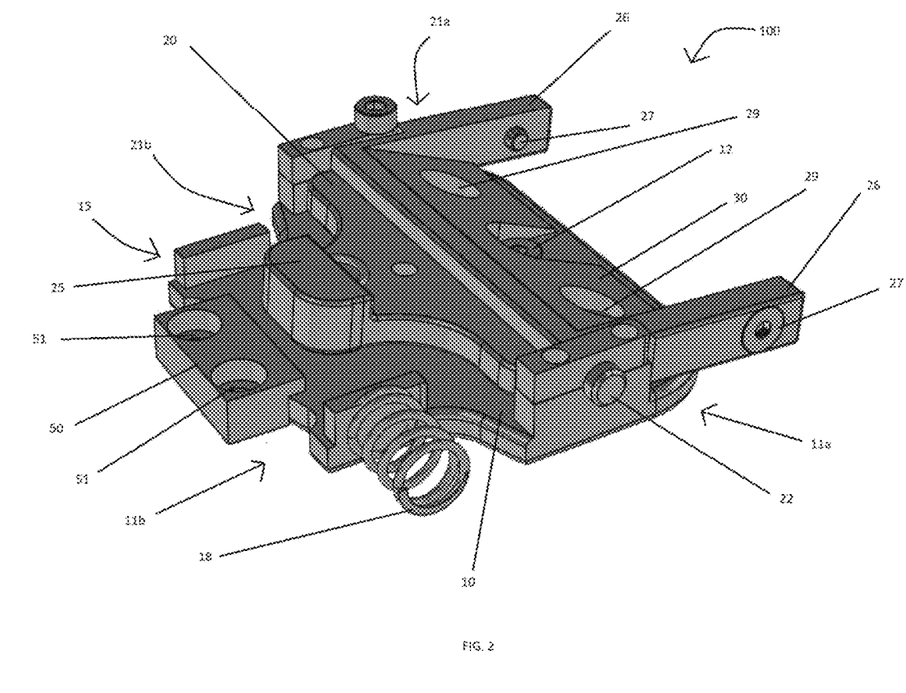
FIG. 2 is a right top perspective view thereof.
Figure 3:
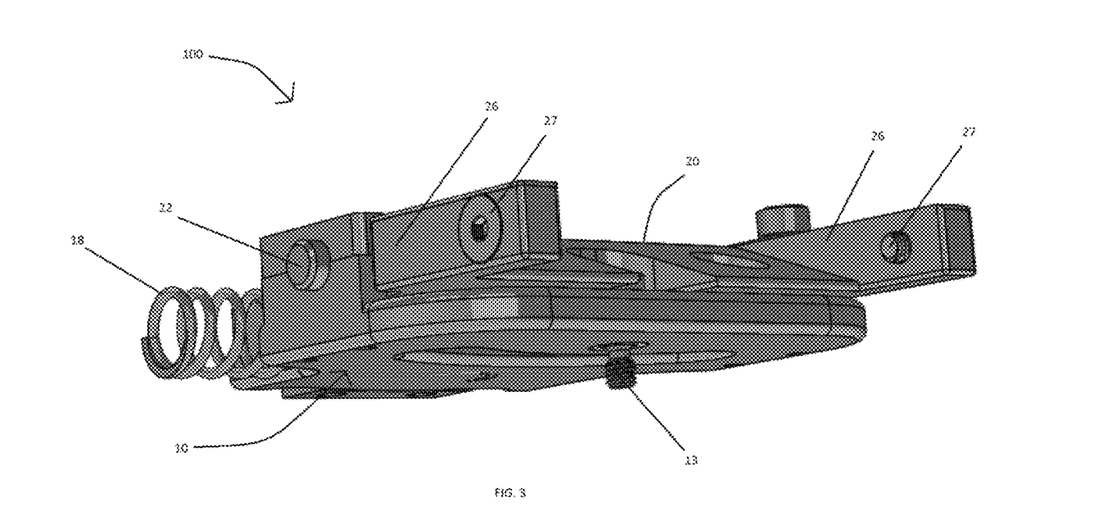
FIG. 3 is a right bottom perspective view thereof.

FIGS. 1-3 illustrate an alignment mechanism 100, in accordance with embodiments of the present disclosure. The alignment mechanism 100 includes two plates—a horizontal adjustment plate 10 and a vertical adjustment plate 20.

In the embodiment shown, the horizontal adjustment plate 10 has a generally dovetail shape, with a front portion 11a being wider than a rear portion 11b. The horizontal adjustment axis 12 is located on the front portion 11a. An opening 13 through the front portion 11a is coaxial with the horizontal adjustment axis 12. A bolt 14 passes through the opening 13 to secure the alignment mechanism 100 to a housing, but still allow pivotal movement of the alignment mechanism 100 about the horizontal adjustment axis 12.

The rear portion 11b includes a horizontal alignment surface 15 on one side and a horizontal tension spring 18 on the opposite side. In the particular embodiment shown, the horizontal alignment surface 15 is on the left side of the rear portion 11b and the horizontal tension spring 18 is on the right side of the rear portion 11b. In further embodiments, the horizontal alignment surface 15 and horizontal tension spring 18 may be switched. The rear portion 11b also includes block 50 with openings 51.

In one embodiment, one or more pins pass through the openings 51. In one embodiment, one or more pins pass through the openings 51 and connect the horizontal adjustment plate 10 to the housing, while still allowing the horizontal adjustment plate to be pivotal about a horizontal adjustment axis.

In the embodiment shown, the vertical adjustment plate 20 also has a generally dovetail shape, with a front portion 21a being wider than a rear portion 21b. The vertical adjustment axis 22 is located near the transition from the front portion 21a to the rear portion 21b and is perpendicular to the horizontal adjustment axis 12. An opening 23 through the vertical adjustment plate 20 is coaxial with the vertical adjustment axis 22. A pin 24 passes through the opening 23 to allow rotational movement of the vertical alignment plate 20 relative to the horizontal alignment plate 10 about the vertical adjustment axis 22.

The front portion 21a has an upper surface 30 contoured to match the lower surface geometry of a rangefinder chassis. Two openings 29 through the upper surface 30 allow the rangefinder chassis (not shown) to secure to the alignment mechanism 100. A pair of legs 26 extend outward from the front portion 21a approximately perpendicular to the vertical adjustment axis 22. The distal ends of the legs 26 each have a securing structure 27 which secures a rangefinder chassis.

The rear portion 21b includes a vertical adjustment surface 25 at its distal end with a vertical tension spring 28 secured between the underside of the vertical adjustment surface 25 and the horizontal adjustment plate 10. As shown in FIGS. 1-3, the vertical adjustment plate 20 is angled relative to the horizontal adjustment plate 10. This is, in part, due to the specific shape of the rangefinder chassis with which the adjustment mechanism 100 will be use, as shown and further described, for example, with respect to FIGS. 4-6. The angle between the vertical adjustment plate 20 and the horizontal adjustment plate 10 is also influenced by the relaxed state of the vertical tension spring 28, which supports the vertical adjustment plate 20, and particularly the vertical adjustment surface 25, away from the horizontal adjustment plate 10, such that the front portion 21a is angled toward the horizontal adjustment plate 10.

Figure 4:
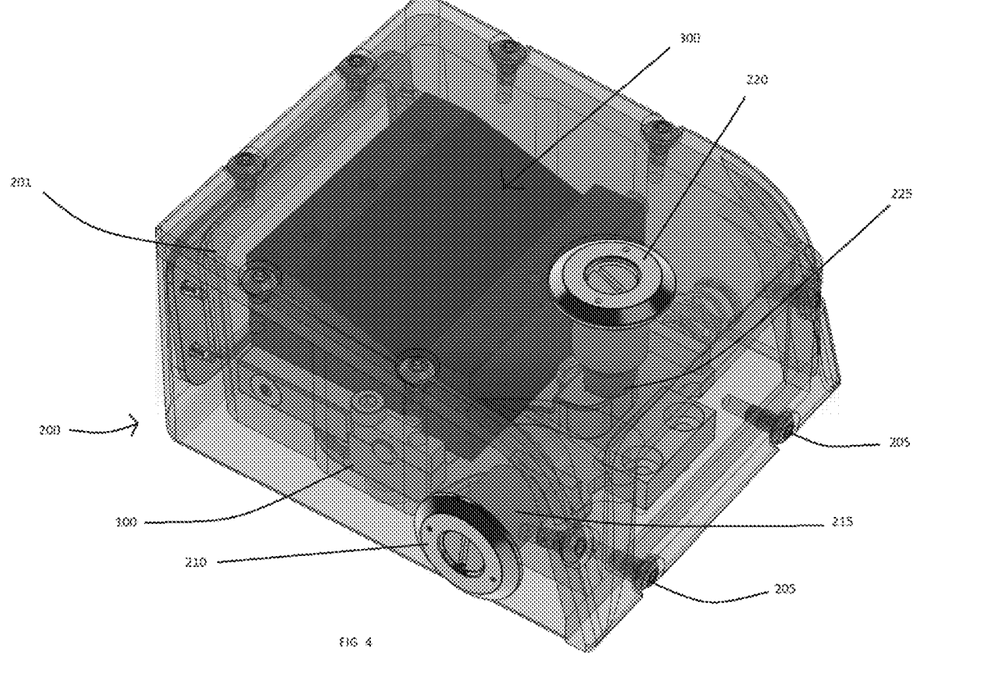
FIG. 4 is a left top perspective view of the alignment mechanism of FIG. 1 in use with a rangefinder chassis in a housing in accordance with embodiments of the disclosure.
Figure 5:
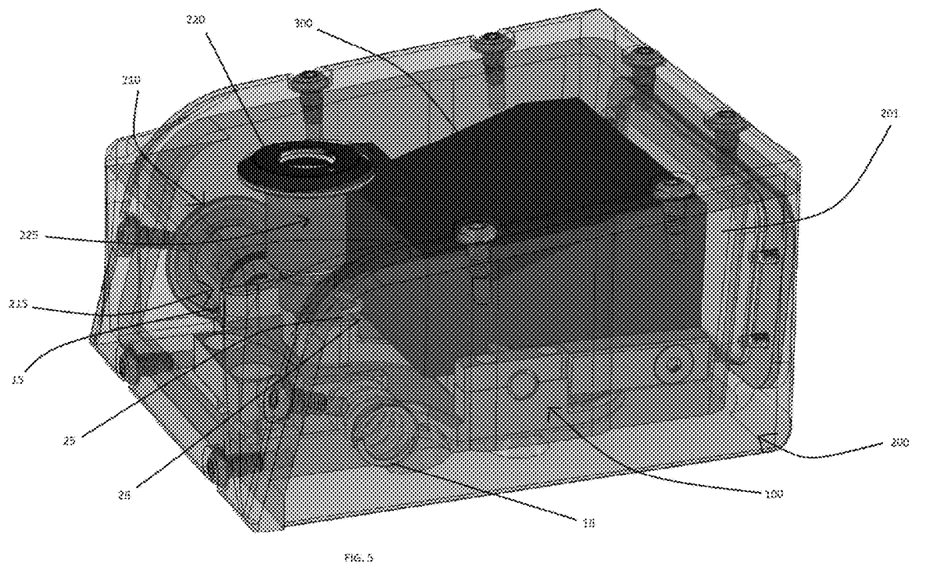
FIG. 5 is a right side perspective view thereof.
Figure 6:
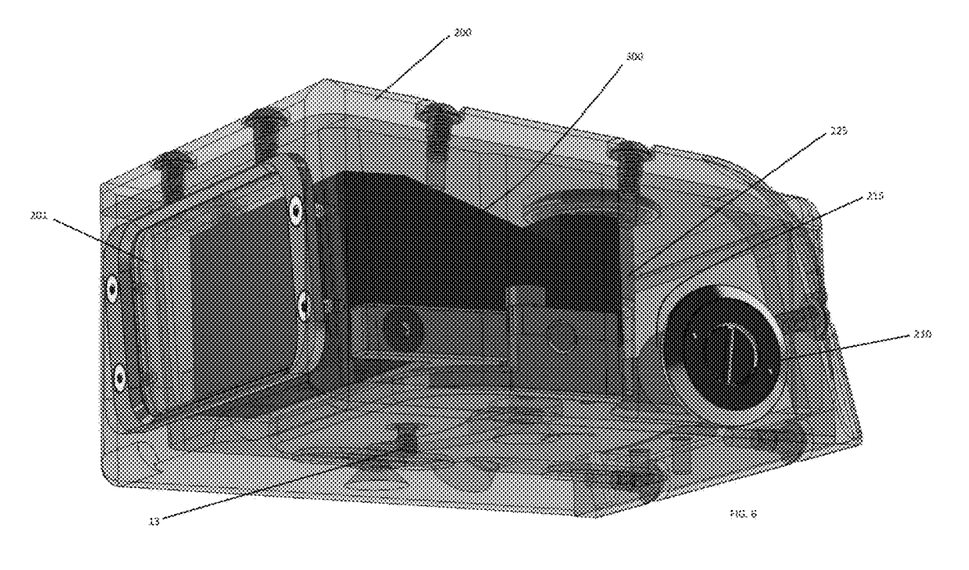
FIG. 6 is a left bottom view thereof.

FIGS. 4-6 illustrate the alignment mechanism 100 of FIGS. 1-3 in use with a rangefinder chassis 300 and contained within a housing 200 to form a rangefinder 400 for use with a firearm. In the embodiment shown, the housing 200 is provided as a plurality of pieces and held together using screws 205. However, in further embodiments, the housing may be provided with more or fewer pieces and/or held together using different structures or devices. The front portion of the housing 200 includes a window 201 which is approximately the same size or larger than the front side of the rangefinder chassis 300.

The housing 200 further includes two openings—a first opening 210 at a side and a second opening 220 at the top. As shown in FIG. 4, a horizontal adjustment plunger 215 engages the first opening 210 in the housing 200. The interior end surface of the horizontal adjustment plunger 215 contacts the horizontal alignment surface 15 of the horizontal adjustment plate 10. Similarly, a vertical adjustment plunger 225 engages the second opening 220 in the housing 200. The interior end surface of the vertical adjustment plunger 225 contacts the vertical alignment surface 25 of the vertical adjustment plate 20.

As shown in FIGS. 4-6, the plungers 215, 225 are threaded within the openings, and the axial position of the plungers 215, 225 is manipulated by a simple screw adjustment. In other embodiments, different structures and/or mechanisms can be used to allow for adjustment of the axial position of the plungers, such as, for example, structures which allow for tool-free adjustment of the plungers.

To adjust the horizontal alignment of the rangefinder, i.e., adjust the position of the rangefinder chassis 300, the axial position of the horizontal adjustment plunger 215 is changed. Moving the horizontal adjustment plunger 215 further into the housing 200 causes the interior end surface of the horizontal adjustment plunger 215 to push against the horizontal alignment surface 15. As the horizontal adjustment plunger 215 continues to push against the horizontal alignment surface 15, the horizontal tension spring 18 is compressed between the horizontal alignment plate 10 and the housing 200, and the horizontal alignment plate 10 pivots about the horizontal adjustment axis 12. In the particular embodiment shown, in which the horizontal alignment surface 15 is on the left side of the horizontal adjustment plate 10 and the horizontal tension spring 18 is on the right side of the horizontal adjustment plate 10, increasing compression of the horizontal tension spring 18 (i.e., moving the horizontal adjustment plunger 215 further into the housing) causes the horizontal adjustment plate 10 to pivot counterclockwise. To adjust the aim in the opposite direction, the horizontal adjustment plunger 215 is moved outward, thereby relieving pressure on the horizontal alignment surface 15 and allowing the horizontal tension spring 18 to relax. Importantly, the horizontal tension spring 18 will never be in a fully relaxed state. There will always be an amount of compression in order to preserve alignment. In the embodiment shown, as the horizontal tension spring 18 is allowed to relax, it pushes the horizontal adjustment plate 10 so that it pivots clockwise about the horizontal adjustment axis 12. It will be appreciated that the opposite will occur should the position of the horizontal alignment surface 15 and horizontal tension spring 18 be reversed.

To adjust the vertical alignment of the rangefinder, i.e., adjust the position of the rangefinder chassis 300, the axial position of the vertical adjustment plunger 225 is changed. Moving the vertical adjustment plunger 225 further into the housing 200 causes the interior end surface of the vertical adjustment plunger 225 to push against the vertical alignment surface 25. As the vertical adjustment plunger 225 continues to push against the vertical alignment surface 25, the vertical tension spring 28 is compressed between the vertical adjustment plate 20 and the horizontal adjustment plate 10, and the vertical alignment plate 20 rotates about the vertical adjustment axis 22. In the particular embodiment shown, increasing compression of the vertical tension spring 28 (i.e., moving the vertical adjustment plunger 225 further into the housing) causes the vertical adjustment plate 20 to rotate such that the front portion 21a of the vertical adjustment plate 20 is raised from the horizontal adjustment plate 10. To adjust the aim in the opposite direction, the vertical adjustment plunger 225 is moved outward, thereby relieving pressure on the vertical alignment surface 25 and allowing the vertical tension spring 28 to relax. Importantly, the vertical tension spring 28 will never be in a fully relaxed state. There will always be an amount of compression in order to preserve alignment. In the embodiment shown, as the vertical tension spring 28 is allowed to relax, it pushes against the underside of the vertical alignment surface 25 to cause the front portion 21a of the vertical adjustment plate 20 to rotate toward the horizontal adjustment plate 10.

By providing two different adjustment plates 10, 20, isolating the adjustment axes 12, 22, and utilizing spring tension with constant tension to fixed alignment points, any movement of the rangefinder chassis 300 and housing 200 due to firearm recoil or transport is returned to the fixed alignment points. In other words, because the tensions springs 18, 28 are never in a fully relaxed stated, there is always a counter force exerted against the adjustment plates 10, 20. As a result, should the rangefinder chassis 300 move within the housing, the tension springs 18, 28 push the adjustment plates 10, 20 back against their respective plungers 215, 225 to put the rangefinder chassis 300 back in its set position.

Although the alignment mechanism is described for use with a rangefinder chassis, it will be appreciate that other devices may by used with the alignment mechanism.

While various embodiments of the alignment mechanism and rangefinder have been described in detail, it should be apparent that modifications and variations thereto are possible, all of which fall within the true spirit and scope of the invention. With respect to the above description then, it is to be realized that the optimum dimensional relationships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A rangefinder comprising:
a housing;
a rangefinder chassis contained within the housing; and
an alignment mechanism contained within the housing, wherein the alignment mechanism comprises
a horizontal adjustment plate pivotal about a horizontal adjustment axis, the horizontal adjustment plate having a front portion through which the first adjustment axis passes and a rear portion having a horizontal alignment surface and a horizontal tension spring secured between the rear portion opposite the horizontal alignment surface and the housing, wherein the front portion of the horizontal adjustment plate is wider than the rear portion of the horizontal adjustment plate, and
a vertical adjustment plate rotatable about a vertical adjustment axis, the vertical adjustment plate having a front portion and a rear portion having a vertical alignment surface, wherein a vertical tension spring is secured between the vertical alignment surface and the rear portion of the horizontal adjustment plate, and further wherein the front portion of the vertical adjustment plate is wider than the rear portion of the vertical adjustment plate,
wherein the horizontal adjustment axis is perpendicular to the vertical adjustment axis, and
wherein the rangefinder chassis is secured to the vertical adjustment plate.

2. The rangefinder of claim 1, wherein the vertical adjustment plate is rotational about the vertical adjustment axis relative to the horizontal adjustment plate.

3. The rangefinder of claim 1, wherein the vertical adjustment plate is secured to the horizontal adjustment plate at the vertical adjustment axis.

4. The rangefinder of claim 1, further comprising a horizontal adjustment plunger which passes through a first opening in the housing to contact the horizontal alignment surface.

5. The rangefinder of claim 4, wherein axial movement of the horizontal adjustment plunger into the housing causes compression of the horizontal tension spring from a first compressed state to a second compressed state.

6. The rangefinder of claim 4, wherein axial movement of the horizontal adjustment plunger into the housing causes the horizontal adjustment plate to pivot about the horizontal adjustment axis from a first position to a second position.

7. The rangefinder of claim 1, further comprising a vertical adjustment plunger which passes through a second opening in the housing to contact the vertical alignment surface.

8. The rangefinder of claim 7, wherein axial movement of the vertical adjustment plunger into the housing causes compression of the vertical tension spring from a first compressed state to a second compressed state.

9. The rangefinder of claim 7, wherein axial movement of the vertical adjustment plunger into the housing causes the vertical adjustment plate to rotate about the vertical adjustment axis relative to the horizontal adjustment plate from a first position to a second position.

10. The rangefinder of claim 1, wherein the horizontal tension spring and vertical tension spring are in compressed states over a range of motion of the horizontal adjustment plate and vertical adjustment plate, respectively.

11. The rangefinder of claim 1 configured to secure to a firearm.

12. The rangefinder of claim 1 configured to secure to a rifle.

* * * * *